July 26, 1938.  J. G. McMAHON  2,124,743
DEVICE FOR FINISHING TUBE ENDS
Filed July 2, 1936  3 Sheets-Sheet 1
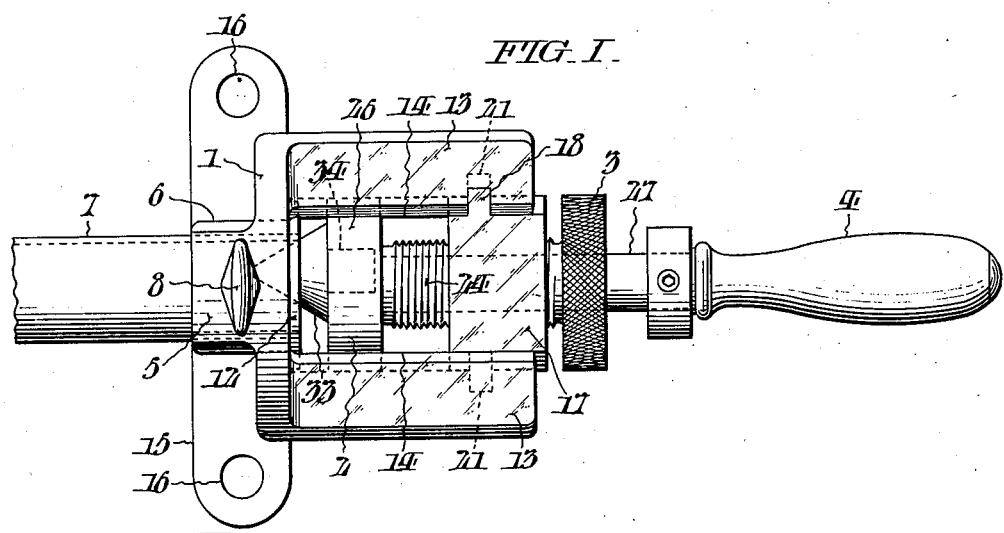
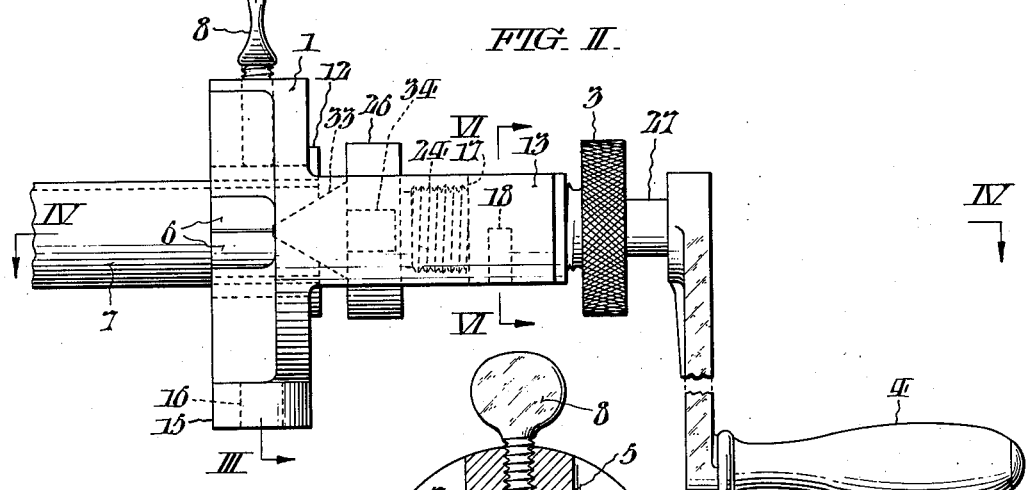
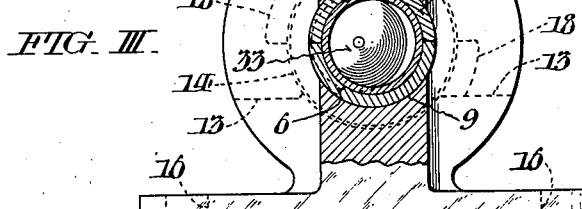
WITNESSES:
INVENTOR:
John G. McMahon,
BY
ATTORNEYS.

July 26, 1938.  J. G. McMAHON  2,124,743
DEVICE FOR FINISHING TUBE ENDS
Filed July 2, 1936  3 Sheets-Sheet 2
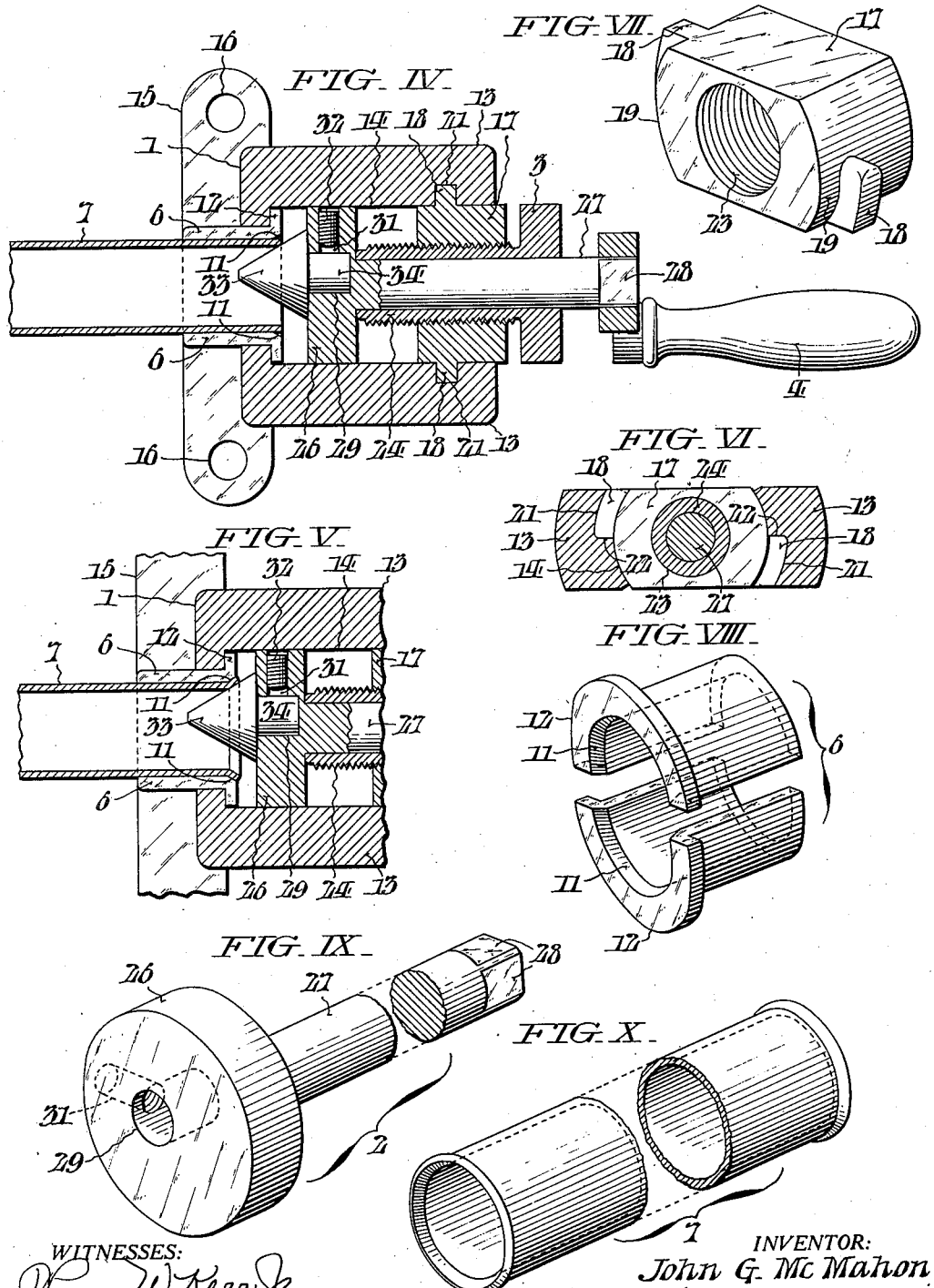
INVENTOR:
John G. McMahon July 26, 1938.   J. G. McMAHON   2,124,743
DEVICE FOR FINISHING TUBE ENDS
Filed July 2, 1936   3 Sheets-Sheet 3
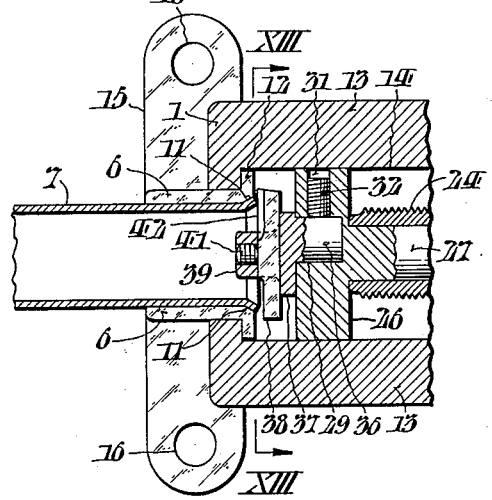
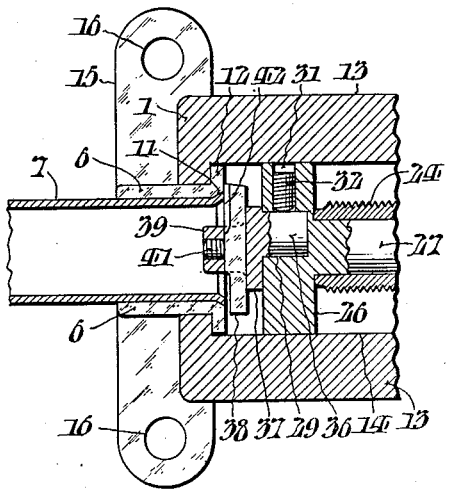
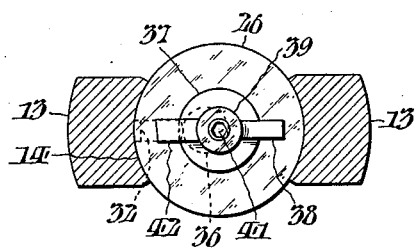
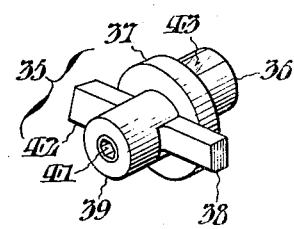
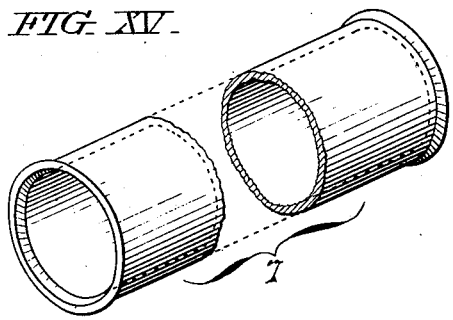
WITNESSES:
Thomas W. Kerr, Jr.
Stanton W. Kerr
INVENTOR:
John G. McMahon,
BY Fralley Paul
ATTORNEYS.

Patented July 26, 1938

2,124,743

UNITED STATES PATENT OFFICE 2,124,743

DEVICE FOR FINISHING TUBE ENDS

John G. McMahon, Philadelphia, Pa.

Application July 2, 1936, Serial No. 88,587

9 Claims. (Cl. 153—81)

My invention relates to a device for finishing tube ends, and more particularly to a portable tool for performing flaring and facing operations on tube ends to prepare the same for water-tight coupling.

Heretofore it has been proposed to make pipe joints for thin wall tubing by flaring and facing the ends of the adjoining tube sections, and maintaining them in pressure contact with each other by means of threaded coupling sleeves. An example of such a pipe joint is represented in U. S. Letters Patent No. 2,036,596, granted to me April 7, 1936. In using a pipe joint of this general character, it is desirable to have a field tool which can be brought to the work and quickly applied thereto, and operated to flare and face the ends of the pipe sections, after they have been cut to the desired lengths.

Obviously the provision of such a portable field tool greatly enlarges the field of use for thin wall tubing, and makes it possible to construct and assemble conduits more inexpensively and with less weight of material. But there are a number of considerations which have made it difficult to produce a satisfactory tool for this purpose: Firstly the tool must be capable of handy and efficient operation, without requiring special skill on the part of the operator; secondly the tool must produce uniform results, insuring water-tight joints; and additionally the tool must be capable of use on tubing of various sizes and so constructed that it can be brought to and passed over the end of the work on which it is to operate.

Accordingly, the principal object of this invention is to provide a tool which satisfies the foregoing considerations and which performs a series of operations, in the proper sequence, to prepare the end of a tube for coupling connection with another similarly prepared tube end.

A further object of the invention is to provide a portable tool of the character described which can be brought to the workpiece and clamped thereon, and which can be used on tubes of varying sizes, the tool being adapted both for the operation of flaring the tube end and for the operation of facing the same.

A further object of the invention is to provide a tool of the character described which operates to flare the ends of the tubes by a true spinning action as distinguished from rivetting or straight pressure application against the tube end.

Other objects and advantages characteristic of my invention, including those derived from compactness and simplicity, will become apparent from the description hereinafter of one example of a tool embodying the invention and its mode of operation, having reference to the accompanying drawings, whereof:

Fig. I represents a plan view of a device embodying the invention, showing a spinning tool inserted in the device and applied to the end of a section of thin wall tubing.

Fig. II represents a side elevation of the same.

Fig. III represents a transverse cross section of the same, taken as indicated by the lines III—III of Fig. II.

Fig. IV represents a longitudinal cross section of the same, taken as indicated by the lines IV—IV of Fig. II.

Fig. V represents a fragmentary cross section, similar to Fig. IV, but showing the tube end in the form which it takes after the spinning tool has operated thereon.

Fig. VI represents a cross section of the yoke of the device, taken as indicated by the lines VI—VI in Fig. II.

Fig. VII represents a perspective view of a removable block, in which the tool holder is inserted.

Fig. VIII represents a perspective view of a pair of die members for accommodating the tube end.

Fig. IX represents a perspective view of the tool holder.

Fig. X represents a perspective view of a section of tubing, as it appears after the spinning operation is completed.

Fig. XI represents a cross section, similar to Fig. IV, but showing a cutting tool substituted for the spinning tool, and in the position occupied at the commencement of the facing operation.

Fig. XII represents a cross section, similar to Fig. IV, but showing the cutting tool substituted for the spinning tool, and in the position occupied at the completion of the facing operation.

Fig. XIII represents a cross section, taken as indicated by the lines XIII—XIII of Fig. XI.

Fig. XIV represents a perspective view of the cutting tool; and,

Fig. XV represents a perspective view of a section of tubing as it appears after completion of the flaring and facing operations.

The device represented in the drawings constitutes a typical embodiment of the invention, and comprises generally a yoke designated at 1, a tool holder designated at 2, means including an adjusting disc 3 for advancing the tool holder towards the work, and means including a crank handle 4 for rotating the tool holder. As shown most clearly in Figs. I, II and III, the yoke 1 has a clamping portion 5 which accommodates a plurality of die members 6 in surrounding relation to the end of the tube 7 on which the device operates. For retaining the die members within the clamping portion 5 of the yoke 1, a clamping screw 8 is employed.

The die members 6 are desirably made in two pieces and in the form shown in Fig. VIII. In order that various sizes of tubes may be accommodated within the device of this invention, it is desirable to have a set of die members, corresponding to the standard sizes of tubing, all such die members having the same outside diameter so that they fit snugly within the annular opening 9 in the yoke 1, but having different inside diameters. Each die member 6 has a bevelled surface 11 surrounding the extreme end of the tube 7, and a flange 12 which presents a smooth plane surface at right angles to the axis of the tube at the extreme end thereof.

The yoke 1 has a pair of spaced arms 13 extending away from the clamping portion 5, the arms having curved surfaces 14 forming a cylindric guideway for the tool holder 2. While the particular form of the yoke 1 may be varied to considerable extent, a flat base 15 is preferably provided, so that when desired the device may be mounted on a workbench and secured by bolts passing through holes 16 in the base. In order, however, that the device may be carried to the work, when desired, the yoke 1 is preferably of relatively light construction, and consists of an integral casting which can be readily grasped by one hand.

A removable block 17 is carried by the free ends of the yoke arms 13, and keyed thereto by lugs 18. The removable block 17 is shown in perspective in Fig. VII. Its side surfaces 19 are curved to conform to the inner curved surfaces 14 of the yoke arms 13. The lugs 18 are adapted to fit within recesses 21, shown most clearly in Fig. VI, and to bear against stops 22. In this manner the removable block 17 can be easily applied and removed, and when it occupies its normal position, bridging the free ends of the yoke arms 13, it becomes in effect a rigid part of the yoke 1. The removable block 17 has an internally threaded aperture 23.

The means for moving the tool holder 2 guidedly towards and away from the die members 6 comprises a sleeve 24 having external threads engaging within the threaded aperture 23 of the removable block 17, and the knurled adjusting disc 3 whereby the sleeve 24 is adapted to be turned by hand. At its inner end the sleeve 24 bears against the tool holder 2. In an obvious manner rotation of the knurled disc 3 in one direction urges the tool holder 2 toward the die members 6, and rotation in the opposite direction permits the tool holder 2 to move away from the die members 6.

The tool holder 2 is most clearly illustrated in Fig. IX. It comprises a circular head 26, and a stem 27 which terminate in a square end 28 adapted to fit within a similarly formed socket of the crank handle 4. The axis of the tool holder stem 27 is coincident with that of the tube 7. In the circular head 26, there is an annular bearing 29 for the accommodation of the tools employed for flaring and facing the tube ends. The annular bearing 29 is disposed eccentrically to the axis of the tool holder 2. A hole 31 is provided which leads from the side of the circular head 26 to the annular bearing 29, and this hole 31 accommodates a set screw 32. For the operation of flaring the ends of the tube 7, a spinning tool 33 is employed, this tool being in the form of a cone and having a stem 34 which fits within the annular bearing 29 of the tool holder 2. The spinning tool 33 revolves freely within the annular bearing 29, independently of the tool holder 2, and by reason of its cone shape, it not only serves to flare the tube ends against the bevelled surface 11 of the die member 6, but the same spinning tool may be used on a number of different sizes of tubes. The spinning tool 33 is adapted to engage the inside of the tube end with rolling pressure contact. With rotation of the crank handle 4, the spinning tool 33 turns about the axis of its stem 34, and also rotates bodily about the axis of the stem 27 of the tool holder 2.

As shown most clearly in Figs. XI–XIV, inclusive, the second operation of the device of this invention involves the use of a facing tool 35 which has a stem 36 adapted to fit snugly within the annular bearing 29 of the tool holder 2. The facing tool 35 desirably has a disc shaped portion 37 which affords a backing for the cutting element 38, and projecting forwardly from the disc shaped portion 37 there is a hub 39 with a transverse slot through which the cutting element 38 is inserted. A set screw 41 is used to secure the cutting element 38 in place. It will be noted that whereas the stem 36 of the facing tool 35 is eccentric to the axis of the tube 7, the hub 39 is concentric with the axis of the tube. Therefore, the cutting element 38 rotates about the axis of the tube 7 as the crank handle 4 is turned. The cutting surface 42 is sufficiently extended in length so that tubes of varying sizes may be faced thereby. In order to insure that the facing tool 35 is mounted substantially concentrically in the tool holder 2, the stem 36 is flattened, as indicated at 43, this flattened surface being engaged by the set screw 32.

The operation of the device of this invention is as follows. When it is desired to flare the end of a tube section 7 which has been cut to the desired length, the tube section may either be brought to the finishing device, or the finishing device may be brought to the tube section. The proper die members 6 having been selected, the yoke 1 with such die members is clamped over the tube end and secured thereto in the position represented in Fig. IV. The spinning tool 33 is inserted in the die holder 2, but it will be noted that the set screw 32 is not used at this point, the spinning tool being mounted freely within the annular bearing 29. When the parts have been thus assembled, the knurled disc 3 is turned to urge the tool holder 2 towards the die members 6. As soon as the spinning tool 33 engages the end of the tube 7 in pressure contact, the crank handle 4 is turned. This causes the spinning tool 33 to roll inside the tube end, engaging only a small fraction of its circumference at one time. A true spinning action thus takes place. The tube end is gradually and smoothly rolled until it assumes the shape shown in Fig. X.

After the flaring operation has been completed, by means of the spinning tool 33, the parts are disassembled, and the facing tool 35 is mounted in the annular bearing 29 of the tool holder 2 and secured in concentric relation therewith by means of the set screw 32. The facing tool 35 is urged toward the tube end by rotation of the knurled disc 3 until it occupies the position represented in Fig. XI, engaging the tube end with pressure contact. The crank handle 4 is then rotated until the tube end has been smoothly faced, and the parts occupy the position shown in Fig. XII. After completion of the flaring and facing operation, the tube 7 has its ends formed in the manner shown in Fig. XV.

In order to prevent the facing tool 35 from biting into the tube end or making a deep cut therein, I have found it desirable to employ a cutter which rotates in the opposite direction from that of the thread used on the adjusting sleeve 24. For example, if a left hand cutter is employed, the adjusting sleeve 24 is provided with a right hand thread, and if a right hand cutter is used, the adjusting sleeve is provided with a left hand thread. It will be understood that during the flaring operation and during the facing operation, the adjusting sleeve 24 will be turned up from time to time by means of the knurled disc 3 to maintain the proper pressure contact between the tool and the tube end.

From the foregoing description, it will be apparent that the device of this invention represents a handy and efficient tool capable of quick application to the work, and permits tube ends to be finished at the scene of operations where conduits are to be assembled.

While I have described a specific form of device embodying my invention, it will be evident that the device herein illustrated represents only one typical example, and that the invention contemplates many variations which fall within the spirit of the claims hereto annexed.

Having thus described my invention, I claim:

1. Portable apparatus for finishing tube ends comprising a yoke including a clamping portion having a die therein surrounding the tube end, and spaced arms extending from said clamping portion and forming a guideway, a removable block keyed to said arms and bridging the free ends thereof, a tool holder movable in the guideway formed by said arms, a sleeve engaging said tool holder and having internal threaded engagement with said removable block whereby the rotation of said sleeve moves said tool holder towards and away from said die, and means for rotating said tool holder, said tool holder having a bearing therein eccentric to its axis of rotation and adapted to accommodate a finishing tool.

2. Portable apparatus for finishing tube ends comprising a yoke including a clamping portion having a die therein surrounding the tube end, and spaced arms extending from said clamping portion and forming a guideway, a removable block keyed to said arms and bridging the free ends thereof, a tool holder movable in said guideway and having a stem whereby the tool holder is rotated about an axis coincident with the axis of the tube, a sleeve surrounding said stem and having internal threaded engagement with said removable block, and means for rotating said sleeve to move said tool holder towards and away from said die, and a finishing tool mounted eccentrically on said tool holder and adapted to engage the inside of the tube end.

3. A device for flaring tube ends comprising clamping means including a die surrounding the tube end, a tool holder, means for guidedly moving the tool holder towards and away from said die, means for rotating said tool holder about an axis coincident with the axis of the tube, and a spinning tool mounted eccentrically on said tool holder and adapted to rotate independently of the same, said tool holder having a bearing for said spinning tool and means associated with said bearing whereby a tool of a different character may be substituted for said spinning tool and secured to said bearing in fixed relation to said tool holder.

4. A device for flaring tube ends comprising clamping means including a die surrounding the tube end, a tool holder, means for guidedly moving the tool holder towards and away from said die, means for rotating said tool holder about an axis coincident with the axis of the tube, and a spinning tool mounted eccentrically on said tool holder and adapted to rotate independently of the same, said tool holder having an annular bore serving as a bearing for said spinning tool, and a set screw associated with said bore whereby a tool of a different character may be inserted in said bore and secured in fixed relation to said tool holder.

5. A device for flaring tube ends comprising clamping means including a die surrounding the tube end, a tool holder, means for guidedly moving the tool holder towards and away from said die, means for rotating said tool holder about an axis coincident with the axis of the tube, and a spinning tool in the form of a cone having a projecting stem at the base thereof, said tool holder having an annular bearing eccentric to its axis of rotation and within which the stem of said spinning tool is journaled for independent rotation, and means associated with said annular bearing whereby a tool of a different character may be substituted for said spinning tool and secured in said bearing in fixed relation to the tool holder.

6. A device for flaring tube ends comprising a yoke including a clamping portion holding a die in surrounding relation to the tube end, and spaced arms extending in parallel relation from said clamping portion and forming a cylindric guideway, a circular tool holder having a sliding contact with said parallel arms and confined thereby to movement along the axis of the tube, means for rotating said tool holder, and a spinning tool freely mounted in said tool holder eccentric to its axis of rotation and adapted to engage the inside of the tube in rolling pressure contact.

7. A device for finishing tube ends comprising clamping means including a die surrounding the tube end, a tool holder, means for guidedly moving the tool holder towards and away from said die, means for rotating said tool holder about an axis coincident with the axis of the tube, said tool holder having an annular bearing eccentric to its axis of rotation and adapted to receive the journal of a rotating tool, a facing tool having a stem fitting in said annular bearing, and means for securing said facing tool within said bearing in fixed relation to said tool holder.

8. A portable device for flaring tube ends comprising clamping means adapted to be passed over the end of a tube, a plurality of die members held by said clamping means in surrounding relation to the tube end, spaced arms extending from said clamping means beyond said tube end and forming a cylindric guideway, a circular tool holder having a sliding contact with said spaced arms and confined thereby to movement along the axis of the tube, means for rotating said tool holder, and a spinning tool freely mounted in said tool holder eccentric to its axis of rotation and adapted to engage the inside of the tube in rolling pressure contact.

9. A portable device for flaring tube ends comprising a yoke including a clamping portion adapted to be passed over the end of a tube, and spaced arms integral with said clamping portion and extending therefrom beyond said tube end and forming a cylindric guideway, a circular tool holder having a sliding contact with said spaced arms and confined thereby to movement along the axis of the tube, means for rotating said tool holder, and a spinning tool freely mounted in said tool holder eccentric to its axis of rotation and adapted to engage the inside of the tube in rolling pressure contact.

JOHN G. McMAHON.